W. T. BEAUCHAMP.
Improvement in Feather Renovators.

No. 132,236.  Patented Oct. 15, 1872.

Witnesses:

Inventor
Wm. T. Beauchamp.
By James L. Norris.
Atty.

UNITED STATES PATENT OFFICE.

WILLIAM T. BEAUCHAMP, OF GRENADA, MISSISSIPPI.

IMPROVEMENT IN FEATHER-RENOVATORS.

Specification forming part of Letters Patent No. 132,236, dated October 15, 1872.

*To all whom it may concern:*

Be it known that I, WILLIAM T. BEAUCHAMP, of Grenada, in the county of Grenada and State of Mississippi, have invented certain Improvements in the Methods of Renovating Feathers, of which the following is a specification:

Nature and Object of the Invention.

My invention relates to certain improvements in feather-renovators; and consists of a cylinder supported by standards or bearings, and having steam-drums, through the medium of which steam is passed to tubes or flues, and projected into the cylinder so as to mingle with the feathers contained therein, and a central shaft provided with arms or beaters for agitating the feathers while being steamed, and in other features, all of which will be fully described and set forth hereafter.

Figure 1:
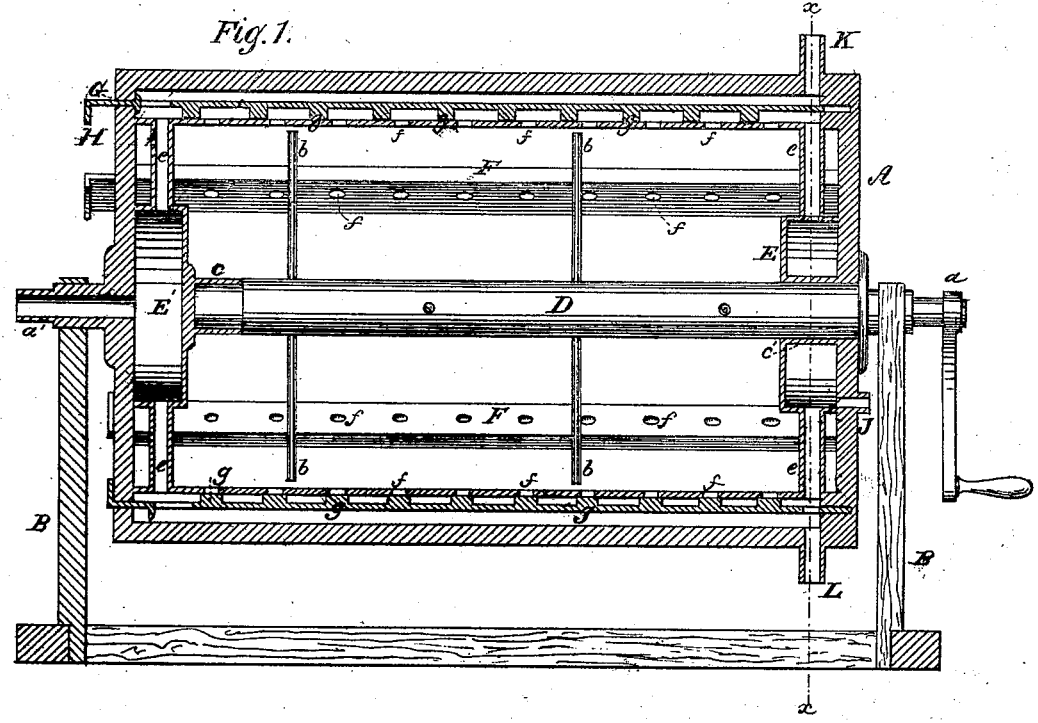
Figure 2:
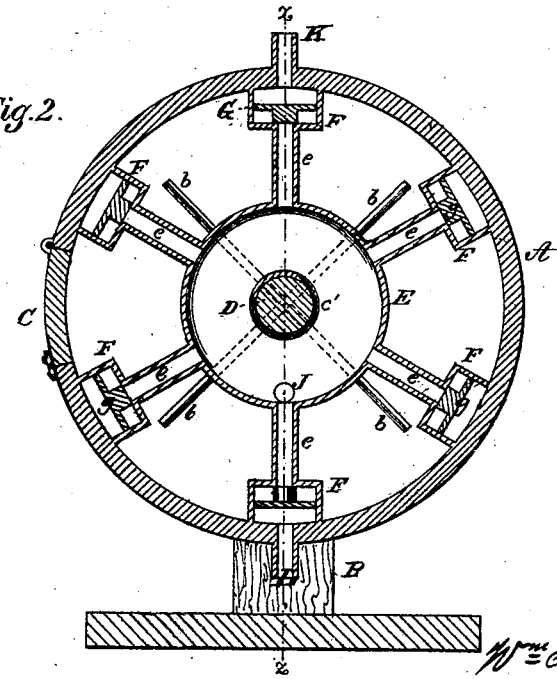

In the accompanying drawing, Figure 1 is a longitudinal central section of my improved apparatus for renovating feathers, &c.; and Fig. 2, a transverse section of the same on the line $x\ x$.

A in the drawing represents a cylinder, of any suitable construction and size, having journals, $a\ a'$, at each end, which are attached to the cylinder in any suitable manner, and rest on vertical standards B B, or may be supported in any other manner to permit the same to be revolved. This cylinder is provided with a hinged lid, C, or other means by which to gain access to the interior of the same. D is a shaft passing through the center of the cylinder, and provided with a series of round arms or beaters, $b$, for the purpose of agitating the feathers while being steamed, as described hereafter. These rounded beaters will be found much more efficient than the flat paddle-shaped agitators now in use, as the latter pack and jam the feathers contained in the cylinder. One end of the shaft D fits in a socket, $c$, of a hollow drum, E', at one end of the cylinder A, and the opposite end passes through a steam-tight socket, $c'$, in a drum, E, at the other end of the cylinder, and projects through to the outside of the latter, to afford a means of attaching a crank with which to revolve the shaft and operate the beaters, when desired. The drums E and E' are provided with a series of radiating hollow arms, $e\ e\ e$, &c., each one of which connects with a hollow tube or flue, F, extending longitudinally along the cylinder, each of these flues being provided with openings $f f$, &c., on the inner portion, for the purpose set forth hereafter. The journal $a'$ upon the cylinder is made hollow and connected with the drum E', so that steam may be introduced from a boiler or otherwise through the journal into the drum, and pass through the hollow arms $e$ into the tubes F, and thence pass out through the openings $f$ and mingle with the feathers, &c., which are being agitated by the beaters $b$, thus effectually cleansing the same and freeing them from all impurities. By introducing the steam through the hollow journal $a'$ into the drum E' and arranging a drum, E, at the opposite end of the cylinder, so that there will be a continuous circuit of steam through the drums, arms, and flues, every portion and particle of the feathers contained in the cylinder will be equally, uniformly, and thoroughly cleansed. In order to cut off the supply of steam to the feathers through the openings $f$ of the flues I arrange slats, G, of wood or other material, in the same, and place rubber or other packings $g$ upon them directly opposite the openings, so as to close and open the same when desired, one end of each slat projecting through one end of the cylinder, and having a handle, H, upon it, by which to operate the same. Supposing the rubber-packings $g$ to be in such a position as to close the openings $f$, and it is desired to permit the steam to have access and mingle with the feathers, by drawing the slats G outward by means of the handles H until the packings $g$ are beyond and uncover the openings, steam is allowed to enter the cylinder and mingle with the feathers, and when it is desired to cut off the supply the slats are pushed inward and the openings all closed simultaneously. J is a tube, which may be provided with a stop-cock arranged at the end of the cylinder, and connecting with the drum E', which is to be closed while steaming the feathers and opened to allow the steam to pass through while drying the feathers. K and L are similar tubes or stop-cocks, which are to be closed while steaming and opened while drying the feathers, to permit the water accumulated by the steam condensing to pass off. After the feathers have been sufficiently cleansed from all impurities and it is desired to dry the same, the stopple is removed from the tube J and the openings $f$ closed by the packings or valves $g$, and steam continued to be passed in at the hollow journal, which will have a continuous circuit through the flues and pass off through the tube J, the heat from the steam effectually drying the feathers.

What I claim as my invention is—

1. The combination of the cylinder A, steam-drums E E', stop-cock J, flues or tubes F, connecting-pipes $e$, hollow journal $a'$, and beaters $b$, substantially as and for the purpose specified.

2. The sliding slats G provided with packing $g$, in combination with the perforated flues F, steam-drums E E', hollow journal $a'$, outlet J, shaft D, beaters $b$, and cylinders A, all arranged and operating substantially as described.

To the above I have signed my name this 27th day of February, A. D. 1872.

WILLIAM T. BEAUCHAMP.

Witnesses:
MAX GURBERGER,
H. B. HEATH.